UNITED STATES PATENT OFFICE.

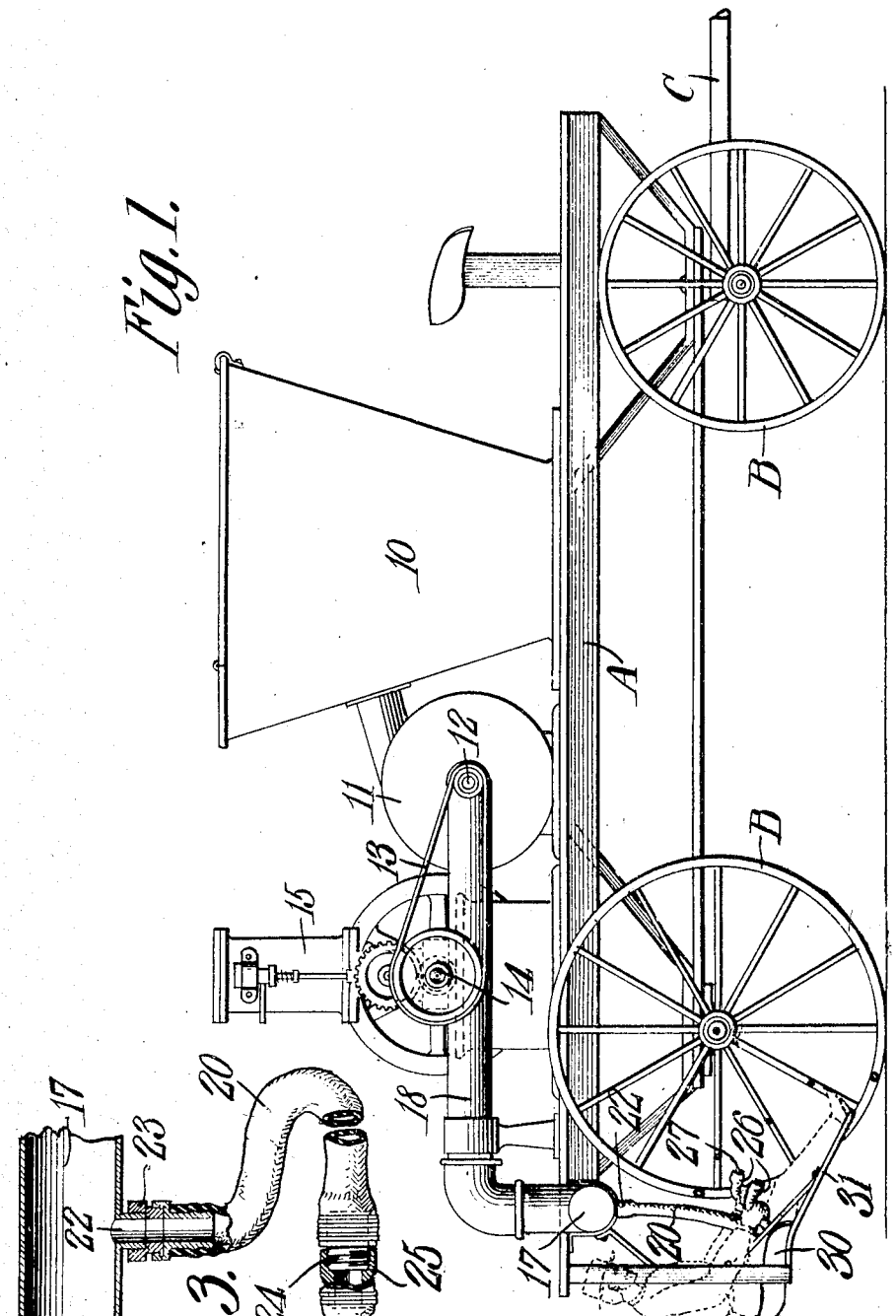

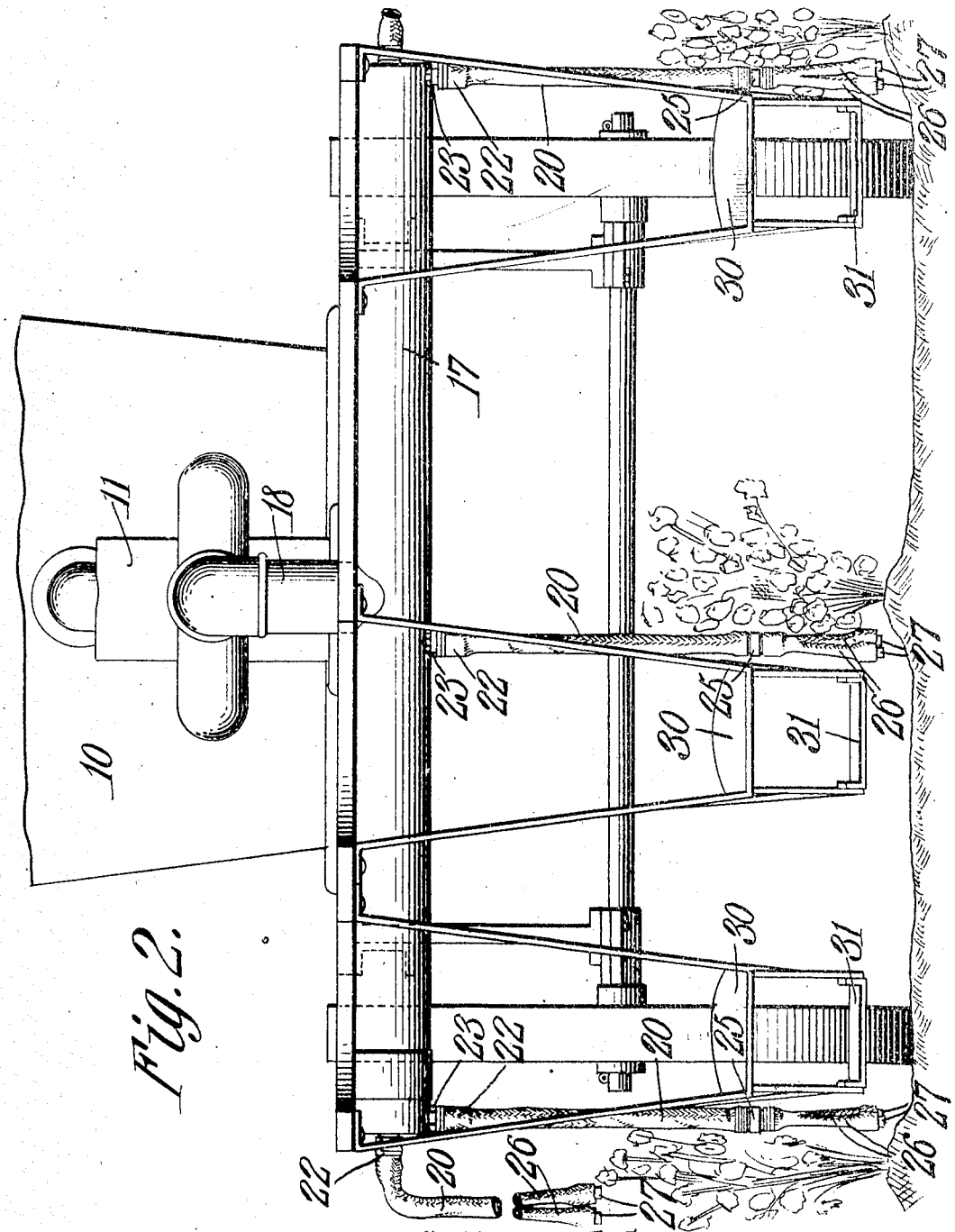

WILLIAM FRANKLIN SPEAR AND EDWARD WOODS TAVEL, OF SELMA, ALABAMA.

COTTON-PICKER.

No. 891,962.          Specification of Letters Patent.          Patented June 30, 1908.

Application filed September 23, 1907. Serial No. 394,225.

*To all whom it may concern:*

Be it known that we, WILLIAM FRANKLIN SPEAR and EDWARD WOODS TAVEL, citizens of the United States, residing at Selma, in the county of Dallas, State of Alabama, have invented a new and useful Cotton-Picker, of which the following is a specification.

This invention relates to pneumatic cotton pickers of that general class in which a wheeled vehicle is arranged to travel through the field of cotton and is provided with suction apparatus so arranged that the cotton may be plucked from the bolls and delivered into a suitable receptacle.

The principal object of the invention is to provide a machine of very simple construction in which provision is made for operating the suction fan or other vacuum producing apparatus independent of the movement of the vehicle, so that the latter may travel at any desired speed and may come to a full stop without affecting the picking operation.

A further object of the invention is to construct an apparatus in which picker tubes are employed the tubes being provided with mouth pieces of comparatively small diameter so that they may be directed against the individual cotton bolls in order to remove the cotton from the bolls without drawing in unnecessary trash and dirt.

A still further object of the invention is to provide a device of this class in which the workmen may be supported by suitable seats hung from the rear portion of the vehicle, and in such position as to have a clear view of the row or rows of cotton plants, so that they will be free to pluck the ripened bolls.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of a pneumatic cotton picker constructed in accordance with the invention. Fig. 2 is a rear elevation of the same. Fig. 3 is a detail sectional view of one of the picker tubes.

Similar numerals of reference are employed to indicate corresponding parts throughout the several figures of the drawings.

The vehicle comprises a suitable platform A supported by front and rear wheels B and provided with a draft tongue C to which the draft animals may be attached in the usual manner.

Mounted on the platform is a receptacle 10 of any suitable size, and to the rear of this receptacle is a rotary fan 11, the shaft 12 of which is connected by a driving belt 13 to the main shaft 14 of a motor 15, the motor in the present instance being in the form of an internal combustion engine, so that the fan may be driven wholly independent of the movement of the vehicle and at any desired speed.

Arranged to the rear of the platform is a transversely disposed suction tube 17 which is connected by a branched tube 18 to the eyes of the fan, the fan operating to produce any desired degree of vacuum in said tube 17.

The apparatus is preferably of such width as to permit the picking of cotton simultaneously from three adjacent rows of plants, and to accomplish this any suitable number of picker tubes 20 may be connected to the main suction tube 17.

The picker tubes are flexible, and preferably are formed of rubber or rubber coated hose, or similar impervious material. Projecting from the tube 17 are a number of threaded nipples 22 which are connected to the upper ends of tubes by couplings 23, the couplings being readily detachable, so that plugs may be placed on those nipples which are not in use, in order not to interfere with the suction through the picker tubes. In the lower free end of each tube is inserted a short cylinder or tube 24, formed of metal or similar rigid material. The tube 24 is provided with threads for the reception of a coupling 25 carrying a pair of bifurcated picker tubes 26 each formed of a section of flexible tubing, and at the end of the tube is a rigid collar or cylinder 27 which serves to prevent collapse of the tube under pressure from the hand of the operator.

The mouths of the tubes 27 are of comparatively small diameter, being just sufficient to receive the cotton from a single boll, so that unnecessary trash and dirt will not be drawn through the tube and delivered into the receptacle.

For convenience of the workmen, seats or saddles 30 are provided, these saddles being so arranged that the workmen seated thereon may readily grasp one picker tube in each hand and manipulate the same, while the head of the workman is below the level of the platform, so that he may readily pick out the ripened bolls and work rapidly without necessitating the stopping of the machine. In order that the workman may be seated as low as possible, stirrup bars 31 are employed.

In carrying out the invention, any desired number of picker tubes may be connected to the main suction pipe 17, and in the present instance three tubes are shown as connected to the lower portion of the main suction tube, and two additional tubes are shown as connected to the ends of the main tube, these being used by workmen walking at the sides of the machine for picking the outer portion of the plants adjacent to the wheels, or for picking the bolls from adjacent rows of plants.

With a device constructed in accordance with this invention, the cotton may be plucked without danger of gathering trash or dirt, so that the cotton will be cleaner and command a much higher price than where a suction apparatus is arranged to cover the entire plant and thus deliver to the receptacle a considerable quantity of foreign matter in addition to the cotton.

We claim:—

1. In a pneumatic cotton picker, a wheeled frame, a receptacle thereon, a suction fan, a fan driving motor, a main suction tube connected to the fan and disposed transversely at the rear of the vehicle, a plurality of flexible picker tubes connected to the main suction tube pendent saddles carried by the frame and disposed adjacent to the picker tubes, whereby the latter may be directly operated to engage the rows of plants over which the picker is advancing.

2. In a pneumatic cotton picker, a wheeled frame, a receptacle thereon, a suction fan, a fan driving motor, a main suction tube connected to the fan, a plurality of flexible picker tubes connected to the main suction tube, pendent saddles carried by the frame and disposed at the rear end thereof adjacent to the picker tubes and at a sufficient distance below the frame, whereby the tubes may be conveniently handled and applied to the plants over which the picker is advancing.

In testimony that we claim the foregoing as our own, we have hereto affixed our signatures in the presence of two witnesses.

WILLIAM FRANKLIN SPEAR.
EDWARD WOODS TAVEL.

Witnesses:
HENRIETTA M. MUELLER,
J. P. DOHERTY.